US012499747B2

(12) United States Patent
Laakso et al.

(10) Patent No.: US 12,499,747 B2
(45) Date of Patent: Dec. 16, 2025

(54) SOLUTION FOR DETECTING AN ARRIVAL OF A MAINTENANCE PERSON TO A MAINTENANCE SITE

(71) Applicant: KONE Corporation, Helsinki (FI)

(72) Inventors: Matti Laakso, Helsinki (FI); Matti Mustonen, Helsinki (FI)

(73) Assignee: KONE Corporation, Helsinki (FI)

( * ) Notice: Subject to any disclaimer, the term of this patent is extended or adjusted under 35 U.S.C. 154(b) by 146 days.

(21) Appl. No.: 18/225,976

(22) Filed: Jul. 25, 2023

(65) Prior Publication Data

US 2023/0368640 A1 Nov. 16, 2023

Related U.S. Application Data

(63) Continuation of application No. PCT/EP2021/055742, filed on Mar. 8, 2021.

(51) Int. Cl.
*G06Q 10/20* (2023.01)
*G08B 21/22* (2006.01)
*B66B 5/00* (2006.01)
*B66B 25/00* (2006.01)

(52) U.S. Cl.
CPC ............ *G08B 21/22* (2013.01); *G06Q 10/20* (2013.01); *B66B 5/0025* (2013.01); *B66B 25/006* (2013.01)

(58) Field of Classification Search
None
See application file for complete search history.

(56) References Cited

U.S. PATENT DOCUMENTS

2018/0075375 A1* 3/2018 Becker ............... G06Q 10/0631
2019/0185293 A1 6/2019 Yang et al.
2021/0316961 A1* 10/2021 Roussel ................ B66B 5/0087

FOREIGN PATENT DOCUMENTS

EP 3 498 648 A2 6/2019
EP 3 498 648 A3 7/2019

OTHER PUBLICATIONS

International Search Report (PCT/ISA/210) issued in PCT/EP2021/055742, dated Nov. 3, 2021.

* cited by examiner

*Primary Examiner* — John F Mortell
(74) *Attorney, Agent, or Firm* — Birch, Stewart, Kolasch & Birch, LLP

(57) ABSTRACT

A method detects an arrival of a maintenance person to a maintenance site. The method includes: scanning radio transmissions from radio devices residing within a radio range of a mobile terminal device carried by the maintenance person; detecting amongst the scanned radio transmissions at least one radio transmission from at least one radio node arranged to the maintenance site for which the maintenance person has at least one open maintenance order; and generating to a remote monitoring unit at least one first control signal including information representing the detection of the arrival of the maintenance person to the maintenance site. Also provided is a detection system, a mobile terminal device, a computer program, and a tangible non-volatile computer-readable medium for detecting an arrival of a maintenance person to a maintenance site.

20 Claims, 4 Drawing Sheets

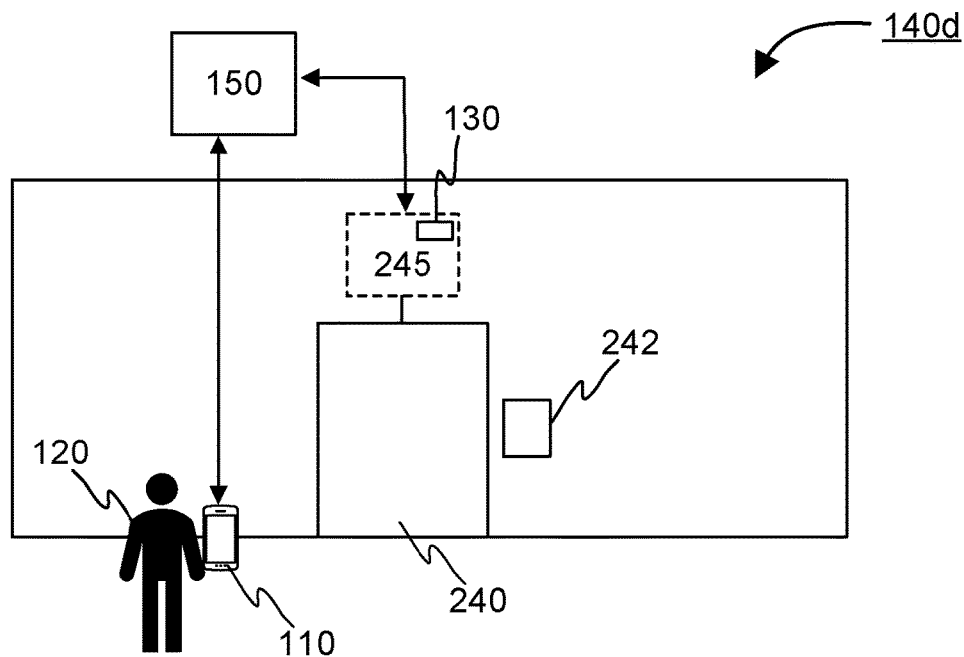
FIG. 2D
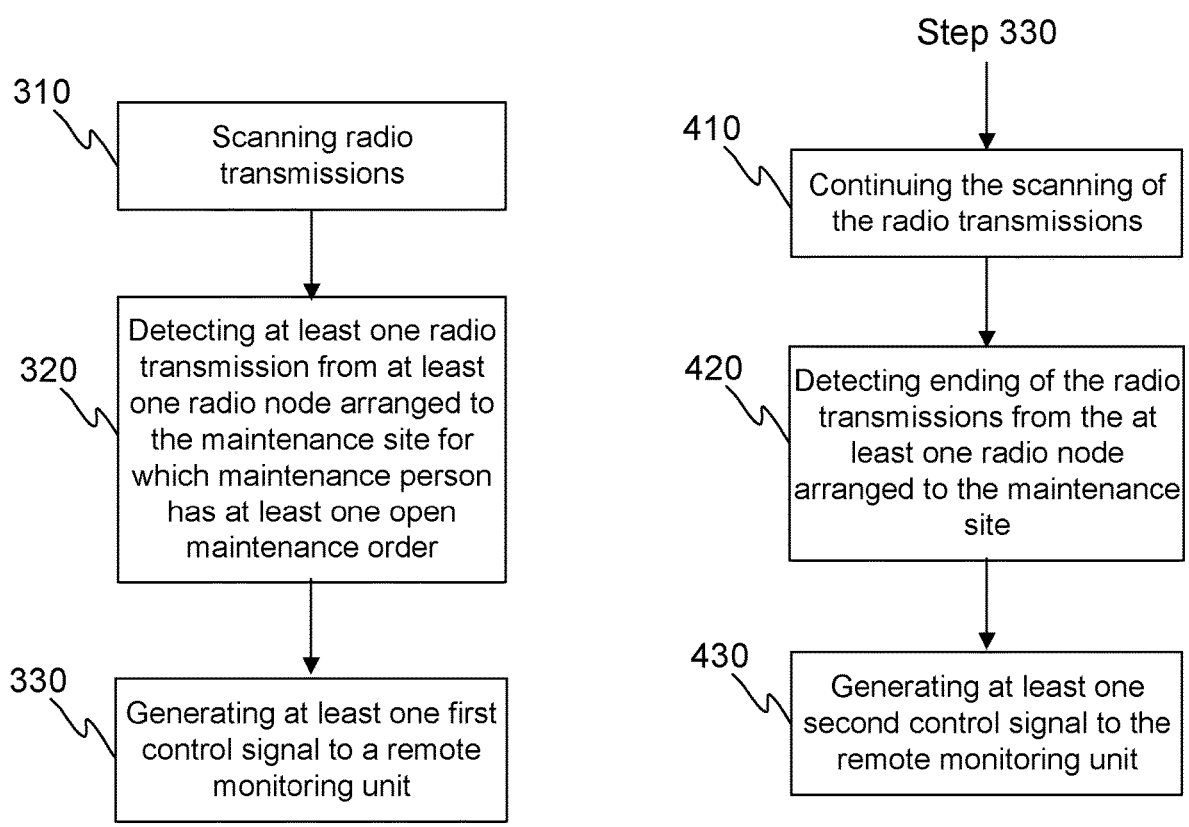
FIG. 3
FIG. 4

SOLUTION FOR DETECTING AN ARRIVAL OF A MAINTENANCE PERSON TO A MAINTENANCE SITE

CROSS REFERENCE TO RELATED APPLICATIONS

This application is a Continuation of PCT International Application No. PCT/EP2021/055742, filed on Mar. 8, 2021, which is hereby expressly incorporated by reference into the present application.

TECHNICAL FIELD

The invention concerns in general the technical field of maintenance. Especially the invention concerns maintenance of people conveyor systems and/or automatic door systems.

BACKGROUND

Typically, a remote monitoring unit, e.g. a service center, may receive continuously, i.e. around the clock, information from one or more maintenance sites, e.g. people conveyor systems, such as elevator systems, escalator systems and/or moving walkaway systems; and/or automatic door systems. For example, the remote monitoring unit may receive fault codes from the one or more maintenance sites and generate maintenance orders, based on the received fault codes, e.g. to maintenance personnel. During a normal maintenance visit, e.g. by the maintenance personnel, one or more maintenance operations may cause generation of one or more unnecessary fault codes to the remote elevator monitoring unit. These unnecessary fault codes, in turn, may lead to the generation of unnecessary maintenance orders. Therefore, the unnecessary fault codes may decrease the accuracy of the generated maintenance orders and increase unnecessary maintenance visits.

Thus, there is a need to develop solutions in order to improve at least partly service accuracy of a people conveyor system or an automatic door system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a detection system, a mobile terminal device, a computer program, and a computer-readable medium for detecting an arrival of a maintenance person to a maintenance site. Another objective of the invention is that the method, the detection system, the mobile terminal device, the computer program, and the computer-readable medium for detecting an arrival of a maintenance person to a maintenance site improve maintenance accuracy of the maintenance site.

The objectives of the invention are reached by a method, a detection system, a mobile terminal device, a computer program, and a computer readable medium as defined by the respective independent claims.

According to a first aspect, a method for detecting an arrival of a maintenance person to a maintenance site is provided, wherein the method comprises:

scanning radio transmissions from radio devices residing within a radio range of a mobile terminal device carried by the maintenance person; detecting amongst the scanned radio transmissions at least one radio transmission from at least one radio node arranged to the maintenance site for which the maintenance person has at least one open maintenance order; and generating to a remote monitoring unit at least one first control signal comprising information representing the detection of the arrival of the maintenance person to the maintenance site in response to the detecting of the at least one radio transmission.

The detecting the at least one radio transmission from the at least one radio node arranged to the maintenance site may comprise detecting at least one radio transmission comprising identifying information of the maintenance site for which the maintenance person has at least one open maintenance order.

The method may further comprise generating an indication of the arrival to the maintenance site via the mobile terminal device for the maintenance person.

The at least one first control signal may further comprise an instruction to ignore subsequent fault codes from said maintenance site and/or to prevent closing of one or more open maintenance orders for said maintenance site.

The method may further comprise: continuing the scanning of the radio transmissions within the radio range of the mobile terminal device carried by the maintenance person after generating the at least first control signal, detecting ending of the radio transmissions from the at least one radio node arranged to the maintenance site, and generating at least one second control signal comprising information representing an exit of the maintenance person from the maintenance site to the remote monitoring unit.

The method may further comprise applying a delay before generating the at least one second control signal.

Alternatively or in addition, the at least one second control signal may further comprise an instruction to terminate the ignoring of the subsequent fault codes from said maintenance site.

The radio transmissions from the at least one radio node 130 may be based on at least one short-range wireless radio technology.

The maintenance site may be a people conveyor system or an automatic door system.

According to a second aspect, a detection system for detecting an arrival of a maintenance person to a maintenance site is provided, wherein the detection system comprises: a mobile terminal device carried by the maintenance person, at least one radio node arranged to the maintenance site, and a remote monitoring unit communicatively coupled to the mobile terminal device, wherein the mobile terminal device is configured to: scan radio transmissions from radio devices residing within a radio range of the mobile terminal device; detect amongst the scanned radio transmissions at least one radio transmission from the at least one radio node arranged to the maintenance site for which the maintenance person has at least one open maintenance order; and generate to the remote monitoring unit at least one first control signal comprising information representing the detection of the arrival of the maintenance person to the maintenance site in response to the detecting of the at least one radio transmission.

The detection of the at least one radio transmission from the at least one radio node arranged to the maintenance site may comprise that the mobile terminal device may be configured to detect at least one radio transmission comprising identifying information of the maintenance site for which the maintenance person has at least one open maintenance order.

The mobile terminal device may further be configured to generate an indication of the arrival to the maintenance site for the maintenance person.

The at least one first control signal may further comprise an instruction to ignore subsequent fault codes from said maintenance site and/or to prevent closing of one or more open maintenance orders for said maintenance site.

The mobile terminal device may further be configured to: continue the scanning of the radio transmissions within the radio range of the mobile terminal device after generating the at least first control signal, detect ending of the radio transmissions from the at least one radio node arranged to the maintenance site, and generate at least one second control signal comprising information representing an exit of the maintenance person from the maintenance site to the remote monitoring unit.

The mobile terminal device may further be configured to apply a delay before generating the at least one second control signal.

Alternatively or in addition, the at least one second control signal may further comprise an instruction to terminate the ignoring of the subsequent fault codes from said maintenance site.

The radio transmissions from the at least one radio node may be based on at least one short-range wireless radio technology.

The maintenance site may be a people conveyor system or an automatic door system.

According to a third aspect, a mobile terminal device for detecting an arrival of a maintenance person to a maintenance site is provided, wherein the mobile terminal device comprises: a processing unit, and a memory unit comprising a computer program code, wherein the memory unit and the computer program code are configured to, with the processing unit, cause the mobile terminal device at least to: scan radio transmissions from radio devices residing within a radio range of the mobile terminal device; detect amongst the scanned radio transmissions at least one radio transmission from the at least one radio node arranged to the maintenance site for which the maintenance person has at least one open maintenance order; and generate to the remote monitoring unit at least one first control signal comprising information representing the detection of the arrival of the maintenance person to the maintenance site in response to the detecting of the at least one radio transmission.

According to a fourth aspect, a computer program is provided, wherein the computer program comprises instructions which, when the program is executed by a mobile terminal device as described above, cause the mobile terminal device to carry out the method as described above.

According to a fifth aspect, a tangible non-volatile computer-readable medium is provided, wherein the tangible non-volatile computer-readable medium comprises the computer program as described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIGS. 2A-2D illustrate schematically examples of a maintenance site according to the invention.

FIG. 3 illustrates schematically an example of a method according to the invention.

FIG. 4 illustrates schematically another example of a method according to the invention.

DESCRIPTION OF THE EXEMPLIFYING EMBODIMENTS

Figure 1:
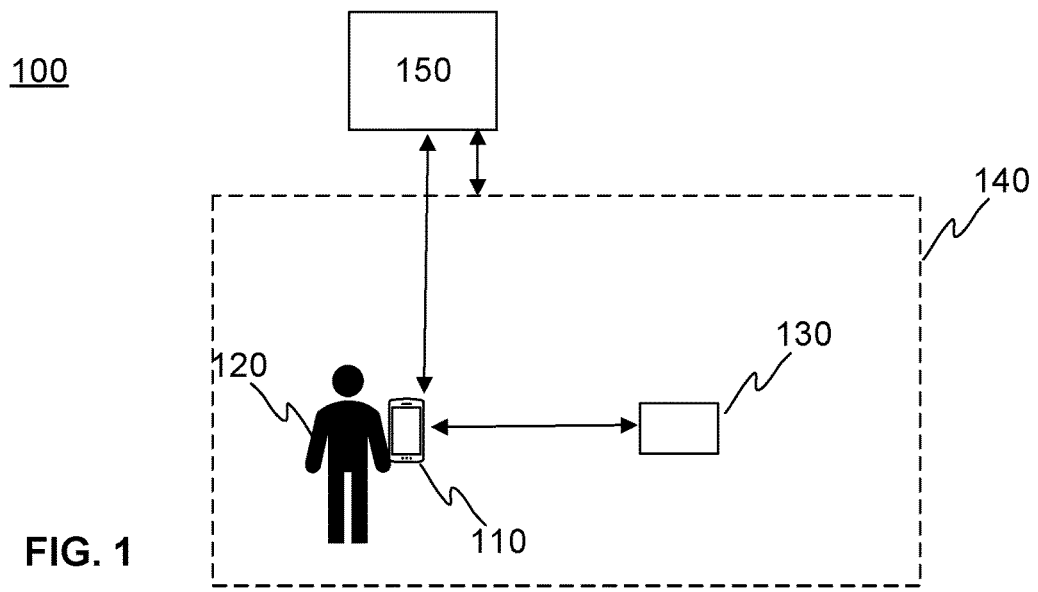
FIG. 1 illustrates schematically an example of a detection system according to the invention.

FIG. 1 illustrates schematically an example of a detection system 100 according to the invention for detecting an arrival of a maintenance person 120 to a maintenance site 140. The detection system 100 according to the invention comprises a mobile terminal device 110 carried by the maintenance person 120, at least one radio node 130 arranged to the maintenance site 140, and a remote monitoring unit 150. The maintenance site 140 may be a people conveyor system 140a-140c or an automatic door system 140d as will be described. The people conveyor system 140a-140c may be an elevator system 140a, an escalator system 140b, or a moving walkaway system 140c. The remote monitoring unit 150 may receive fault codes from the maintenance site 140, 140a-140d and generate maintenance orders, e.g. service needs, based on the received fault codes, for example to the maintenance person 120.

The mobile terminal device 110 carried by the maintenance person 120 may for example be a mobile phone or a tablet computer. The mobile terminal device 110 of the detection system 100 according to the invention may comprise a communication interface unit 530 for providing an interface for communication with any other unit, e.g. the at least one radio node 130 arranged to the maintenance site 140; one or more other radio devices, such as other mobile terminal devices; the remote monitoring system 150; and/or any other units. The communication interface unit 530 of the mobile terminal device 110 carried by the maintenance person 120 may comprise one or more communication devices e.g. at least one radio transceiver, at least one antenna, etc. The communication between the mobile terminal device 110 and the at least one radio node 130 arranged to the maintenance site 140, 140a-140d and/or between the mobile terminal device 110 and the one or more other radio devices may be based on at least one short-range wireless radio technology. The at least one short-range wireless radio technology may comprise e.g., but is not limited to, Bluetooth, wireless local area network (WLAN), and/or Zigbee. The mobile terminal device 110 may be configured to receive and transmit radio transmissions from and to the at least one radio node 130 arranged to the maintenance site 140, 140a-140d and/or from and to the other radio devices, e.g. mobile terminal devices carried by other users than the maintenance person 120. The communication between the mobile terminal device 110 and the remote monitoring unit 150 may be based on one or more known wireless communication technologies.

The at least one radio node 130 of the detection system 100 according to the invention may comprise a communication interface unit for providing an interface for communication with any other unit, e.g. the mobile device 110 carried by the maintenance person 120; one or more other radio devices, such as other mobile terminal devices; and/or any other units. The communication interface unit of the at least one radio node 130 may comprise one or more communication devices e.g. at least one radio transceiver, at least one antenna, etc. The communication between the at least one radio node 130 arranged to the maintenance site 140, 140a-140d and the mobile device 110 carried by the maintenance person 120 and/or between the at least one radio node 130 arranged to the maintenance site 140, 140a-140d and the one or more other radio devices may be based on at least one short-range wireless radio technology. The at least one short-range wireless radio technology may comprise e.g., but is not limited to, Bluetooth, wireless local area network (WLAN), and/or Zigbee. The at least one node device 130 may be configured to receive and transmit radio transmissions from and to the mobile device 110 carried by the maintenance person 120 and/or from and to the other radio devices, e.g. mobile terminal devices carried by other users than the maintenance person 120. The at least one radio node 130 of the detection system 100 according to the invention may be arranged to the maintenance site 140, 140a-140d specifically for a detection of the arrival of the maintenance person 120 to the maintenance site 140, 140a-140d. Alternatively or in addition, the at least one radio node 130 may be already existing at least one radio node 130 at the maintenance site 140, 140a-140d, which may also be used, in addition to the detection of the arrival of the maintenance person 120 to the maintenance site 140, 140a-140d, for one or more other purposes in the maintenance site 140, 140a-140d.

Figure 2A:
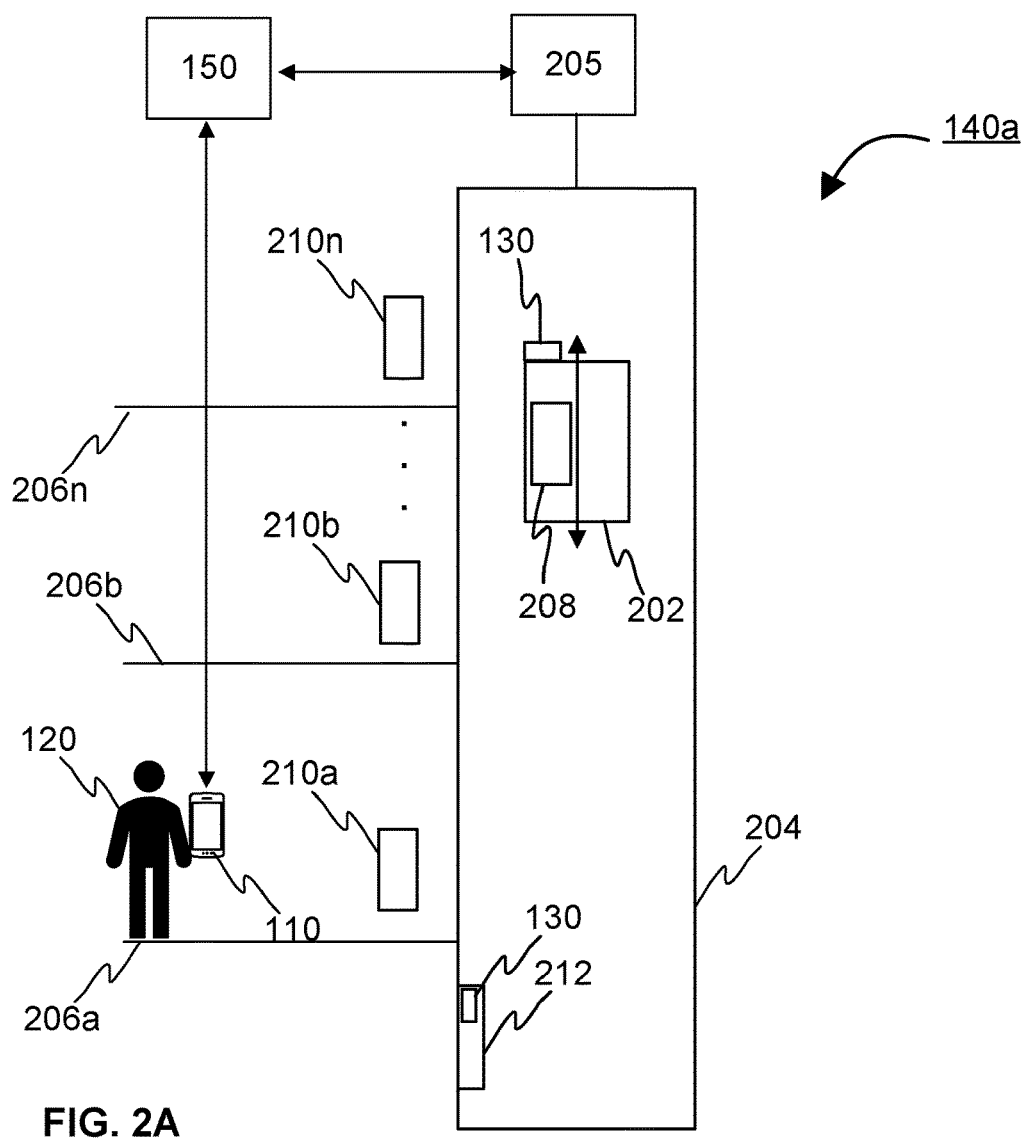

FIGS. 2A-2D illustrate schematically examples of the maintenance site 140, 140a-140d according to the invention. In the example of FIG. 2A the maintenance site 140 is an elevator system 140a. The elevator system 140a may comprise at least one elevator car 202 configured to travel along a respective at least one elevator shaft 204 between a plurality of landings 206a-206n and an elevator control system, e.g. an elevator control unit, 205. The example elevator system 140a of FIG. 2A comprises one elevator car 202 travelling along one elevator shaft 204, however the elevator system 140a may also comprise an elevator group, i.e. group of two or more elevator cars 202 each travelling along a separate elevator shaft 204 configured to operate as a unit serving the same landings 206a-206n. The elevator control system 205 may be configured to control the operation of the elevator system 140a at least in part. The elevator control system 205 may reside e.g. in a machine room (for sake of the clarity not shown in FIG. 2A) or in one of the landings 206a-206n of the elevator system 140a.

The elevator system 140a may further comprise user interface devices 208, 210a-210n, 212, which enable interaction of users, such as passengers and/or maintenance personnel, with the elevator system 140a. The user interface devices 208, 210a-210n, 212, may comprise e.g. a car operating panel 208 arranged inside each elevator car 202, a landing call panel 210a-210n arranged to each landing 206a-206n, and at least one maintenance panel 212, e.g. an inspection drive station, a maintenance access panel (MAP), test and emergency panel, and/or any other maintenance or inspection related panels, for providing one or more maintenance, test, inspection and/or emergency operations of the elevator system 140a. In the example of FIG. 2A one maintenance panel 212 of the elevator system 140a is shown, but the elevator system 140a may further comprise one or more other maintenance panels 212. The example maintenance panel 212 of the elevator system 140a of FIG. 2A is arranged inside the pit of the elevator shaft 204. Alternatively or in addition, the one or more maintenance panels 212 may be arranged to the at least one elevator car 202, inside a machine room, one or more landings 206a-206n, and/or any other location within the elevator system 140a. The at least one maintenance panel 212 shall be accessible to authorized persons only. The user interface devices 208, 210a-210n, 212, may comprise input devices, e.g. buttons, keyboard, touch screen, and similar, for requesting a service from the elevator system 140a, i.e. for interacting with at least one user. The requested service may e.g. refer to requesting a transportation from the elevator system 140a, requesting opening/closing of elevator doors (car doors and/or landing doors), requesting a communication connection to a service center, indicating an emergency situation, and so on. Furthermore, the user interface devices 208, 210a-110n, 212, may comprise one or more output devices, e.g. display, loudspeaker, touch screen, etc., for outputting information. The elevator system 140a may further comprise one or more other known elevator related entities, e.g. hoisting system, safety circuit and devices, elevator door system, etc., which are not shown in FIG. 2A for sake of clarity.

Next example locations of the at least one radio node 130 are discussed, when the maintenance site 140 is the elevator system 140a. The at least one radio node 130 may for example be arranged to the at least one elevator car 202, e.g. on the rooftop of the at least one elevator car 202; the at least one maintenance panel 212; the car operating panel 208 of the elevator car 202; at least one landing call device 210a-210n; and/or any other location of the elevator system 140a. For example, if the elevator system 140a comprises one or more wireless elevator call buttons or stations, at least one of the one or more wireless elevator call buttons or stations may comprise at least one radio node 130. In FIG. 2A some non-limiting examples to arrange the at least one radio node 130 to the elevator system 140a are illustrated. The example elevator system 140a of FIG. 2A comprises one radio node 130 arranged to the at least one elevator car 202, e.g. on the rooftop of the elevator car 202, and one radio node 130 arranged to the maintenance panel 212. As mentioned, FIG. 2A illustrates only some non-limiting example of the at least one radio node 130 of the elevator system 140a, but the detection system 100 according to the invention may comprise any other number of radio nodes 130 arranged to any locations of the elevator system 140a.

Figure 2B:
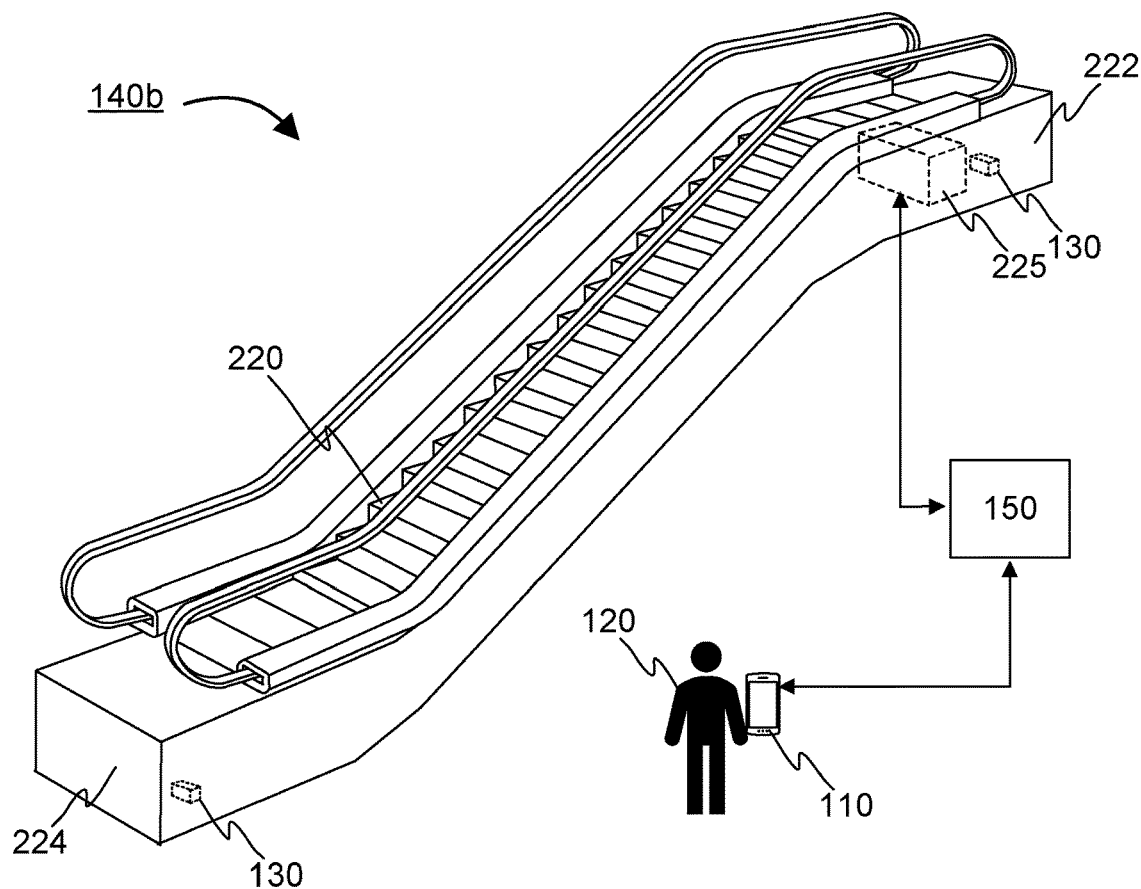

In the example of FIG. 2B the maintenance site 140 is an escalator system 140b. The escalator system 140b may comprise a conveying entity 220 comprising steps arranged to an endless track, and an escalator control system, e.g. an escalator control unit, 225. The escalator control system 225 may be configured to control the operation of the escalator system 140b. The escalator control system 225 may for example be arranged to one of platforms 222, 224 of the escalator system 140b. In the example of FIG. 2B the escalator control system 225 is arranged to a first platform, i.e. a top platform, 222 of the escalator system 140b.

Alternatively, the escalator control system 225 may be arranged to a second platform, i.e. a bottom platform, 224 of the escalator system 140*b*. The escalator system 140*b* may further comprise one or more other known escalator related entities, e.g. a driving machine, etc., which are not shown in FIG. 2B for sake of clarity. Next example locations of the at least one radio node 130 are discussed, when the maintenance site 140 is the escalator system 140*b*. The at least one radio node 130 may for example be arranged to the escalator control system 225, the first platform 222, the second platform 224, and/or any other location of the escalator system 140*b*. In FIG. 2B a non-limiting example to arrange the at least one radio node 130 to the escalator system 140*b* is illustrated. The example escalator system 140*b* of FIG. 2B comprises one radio node 130 arranged to the top platform 222 of the escalator system 140*b* next to the escalator control system 225 and radio node 130 arranged to the bottom platform 224 of the escalator system 140*b*. As mentioned, FIG. 2B illustrates only one non-limiting example of the at least one radio node 130 of the escalator system 140*b*, but the detection system 100 according to the invention may comprise any other number of radio nodes 130 arranged to any locations of the escalator system 140*b*.

Figure 2C:
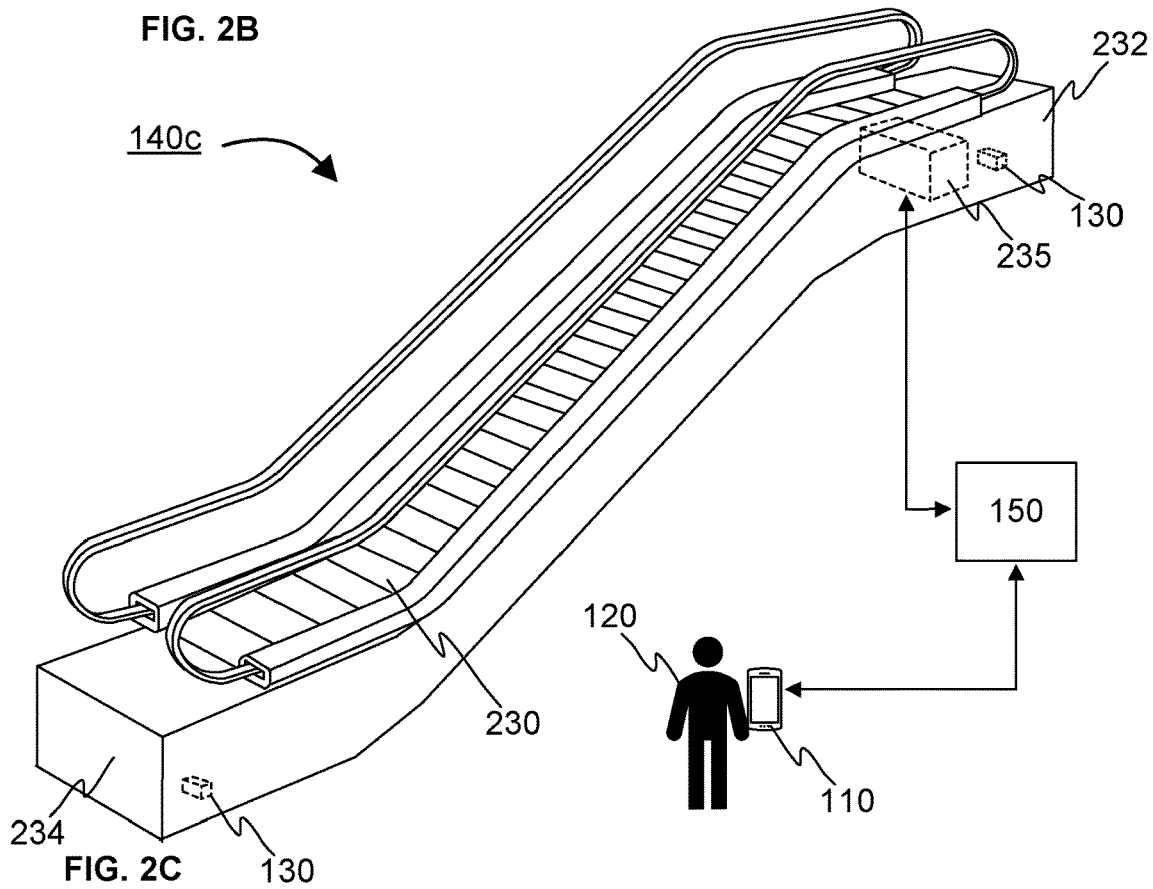

In the example of FIG. 2C the maintenance site 140 is a moving walkaway system 140*c*. The moving walkaway system 140*c* may comprise a conveying entity 230 comprising pallets arranged to an endless track, and a moving walkaway control system, e.g. an moving walkaway control unit, 235. The moving walkaway control system 235 may be configured to control the operation of the moving walkaway system 140*c*. The moving walkaway control system 235 may for example be arranged to one of platforms 232, 234 of the moving walkaway system 140*c*. In the example of FIG. 2C the moving walkaway control system 235 is arranged to a first platform, i.e. a top platform, 232 of the moving walkaway system 140*c*. Alternatively, the moving walkaway control system 235 may be arranged to a second platform, i.e. a bottom platform, 234 of the moving walkaway system 140*c*. In the example of FIG. 2C the moving walkaway system 140*c* is an inclined moving walkaway system, i.e. a moving walkaway system configured to convey people or load across an inclined plane, e.g. between two floors. However, the moving walkaway system 140*c* according to the invention may also be a horizontal moving walkaway system, i.e. a moving walkaway system configured to convey people or load across a horizontal plane. The moving walkaway system 140*c* may further comprise one or more other known moving walkaway related entities, e.g. a driving machine, etc., which are not shown in FIG. 2C for sake of clarity. Next example locations of the at least one radio node 130 are discussed, when the maintenance site 140 is the moving walkaway system 140*c*. The at least one radio node 130 may for example be arranged to the moving walkaway control system 235, the first platform 232, the second platform 234, and/or any other location of the moving walkaway system 140*c*. In FIG. 2C a non-limiting example to arrange the at least one radio node 130 to the moving walkaway system 140*c* is illustrated. The example moving walkaway system 140*c* of FIG. 2B comprises one radio node 130 arranged to the top platform 232 of the moving walkaway system 140*c* next to the escalator control system 235 and radio node 130 arranged to the bottom platform 234 of the moving walkaway system 140*c*. As mentioned, FIG. 2C illustrates only one non-limiting example of the at least one radio node 130 of the moving walkaway system 140*c*, but the detection system 100 according to the invention may comprise any other number of radio nodes 130 arranged to any locations of the moving walkaway system 140*c*.

In the example of FIG. 2D the maintenance site 140 is an automatic door system 140*d*. The automatic door system 140*d* may comprise at least one automatic door 240 and a door control system, e.g. an door control unit, 245. The door control system 245 may be configured to control the operation, e.g. opening and/or closing, of the at least one automatic door 240. The at least one automatic door 240 may be an elevator car door, a building door, or a door of gate device, e.g. a security gate or a turnstile type gate. In other words, the automatic door system 140*d* may for example be a building door system or a gate system. In the example of FIG. 2D the automatic door 240 is a building door. The automatic door system 140*d* may further comprise at least one user interface device 242, which enable interaction of users, such as passengers and/or maintenance personnel, with the automatic door system 140*d*. The at least one user interface device 242 of the automatic door system 140*d* may for example be used for access control via the automatic door 240. The automatic door system 140*d* may further comprise one or more other known automatic door related entities, e.g. driving machine etc., which are not shown in FIG. 2D for sake of clarity. Next example locations of the at least one radio node 130 are discussed, when the maintenance site 140 is the automatic door system 140*d*. The at least one radio node 130 may for example be arranged to the door control system 245, the at least one automatic door 240, to the at least one user interface device 242, and/or any other location of the automatic door system 140*d*. In FIG. 2D a non-limiting example to arrange the at least one radio node 130 to the automatic door system 140*d* is illustrated. The example automatic door system 140*d* of FIG. 2D comprises one radio node 130 arranged to the door control system 245. As mentioned, FIG. 2D illustrates only one non-limiting example of the at least one radio node 130 of the automatic door system 140*d*, but the detection system 100 according to the invention may comprise any other number of radio nodes 130 arranged to any locations of the automatic door system 140*d*.

Now, at least some aspects of the present invention are described by referring to FIG. 3 in which an example of a method for detecting the arrival of the maintenance person 120 to the maintenance site 140, 140*a*-140*d* is schematically illustrated, wherein the maintenance site 140 may be a people conveyor system 140*a*-140*c*, e.g. an elevator system 140*a*, an escalator system 140*b*, or a moving walkaway system 140*c*, or an automatic door system 140*d* as discussed above. The expression "arrival of the maintenance person 120 to the maintenance site 140, 140*a*-140*d*" means in the context of this application arrival of the maintenance person 120 to an area surrounding the maintenance site 140, 140*a*-140*d* that may comprise one or more entities of the maintenance site 140, 140*a*-140*d*.

At a step 310, the mobile terminal device 110 carried by the maintenance person 120 scans, i.e. observes, radio transmissions from radio devices residing within a radio range, i.e. a radio coverage, of the mobile terminal device 110 carried by the maintenance person 120. The mobile terminal device 110 is capable to receive radio transmissions from radio devices, e.g. from the at least one radio node 130 arranged to the maintenance site 140, 140*a*-140*d* and/or other mobile terminal devices, etc., within its radio range. The term radio range means an area within which the communication interface unit 530 of the mobile terminal device 110 may receive the radio transmissions from the radio devices. By arranging a plurality of radio nodes 130 to different locations of the maintenance site 140, 140a-140d, a larger, i.e. a wider, part of the maintenance site 140, 140a-140d may be covered by the radio nodes 130, which in turn, may improve the accuracy of the reception of the radio transmissions from the radio nodes 130 by the mobile terminal device 110. The radio transmissions from the radio devices, e.g. the at least one radio node 130 arranged to the maintenance site 140, 140a-140d, may be based on at least one short-range wireless radio technology, e.g. Bluetooth, WLAN and/or Zigbee.

At a step 320, the mobile terminal device 110 carried by the maintenance person 120 detects amongst the scanned radio transmissions at least one radio transmission from the at least one radio node 130 arranged to the maintenance site 140, 140a-140d for which the maintenance person 120 has at least one open maintenance order. The detecting of the at least one radio transmission from the at least one radio node 130 arranged to the maintenance site 140, 140a-140c at the step 320 may comprise detecting at least one radio transmission comprising identifying information of the maintenance site 140, 140a-140d for which the maintenance person 120 has at least one open maintenance order. In other words, the detected at least one radio transmission may comprise identifying information of the maintenance site 140, 140a-140d for which the maintenance person 120 has at least one open maintenance order. The at least one open maintenance orders assigned to the maintenance person 120 may be stored to the mobile terminal device 110 carried by the maintenance person 120, e.g. to a memory unit 520 of the mobile terminal device 110. The mobile terminal device 110 may receive the at least one open maintenance orders from the remote monitoring unit 150 as described. Each of the at least one open maintenance order may comprise maintenance information including for example, but not limited to, the identifying information of the maintenance site 140, 140a-140d, and/or the received fault codes. The radio transmissions from each radio node 130 arranged to the maintenance site 140, 140a-140d may comprise at least the identifying information of the maintenance site 140, 140a-140d. The identifying information of the maintenance site 140, 140a-140d may comprise for example an equipment number of the maintenance site 140, 140a-140d and/or an equipment number of one or more entities of the maintenance site 140, 140a-140d. The identifying information of the maintenance site 140, 140a-140d may be comprised for example in a payload of the radio transmissions. In addition to the identifying information of the maintenance site 140, 140a-140d, the radio transmissions from each radio node 130 may comprise an identifier (ID) assigned, i.e. specific, to said radio node 130, e.g. a Bluetooth address (BD_ADDR) or a medium access control (MAC) address. The ID assigned to said radio node 130 may depend on the used short-range wireless radio technology.

At a step 330, in response to the detecting of the at least one radio transmission from the at least one radio node 130 arranged to the maintenance site 140, 140a-140d for which the maintenance person 120 has the open maintenance order, the mobile terminal device 110 generates at least one first control signal to a remote monitoring unit 150. The at least one first control signal may comprise information representing the detection of the arrival of the at least one maintenance person 120 to the maintenance site 140, 140a-140d. This enables a ubiquitous and a simple method to detect the arrival of the at least one maintenance person 120 to the maintenance site 140, 140a-140d. In other words, the scanned radio transmission may comprise the at least one radio transmission from the at least one radio node 130 arranged to the maintenance site 140, 140a-140d for which the maintenance person 120 has the at least one open maintenance order and/or at least one radio transmission from at least one radio node 130 arranged to a maintenance site 140 for which the maintenance person 120 does not have at least one open maintenance order. However, the at least one first control signal to the remote monitoring unit 150 is generated only in response to detecting the at least one radio transmission from the at least one radio node 130 arranged to the maintenance site 140, 140a-140d for which the maintenance person 120 has the at least one open maintenance order. The remote monitoring unit 150 may be located on-site, i.e. at the maintenance site 140, 140a-140d, or off-site, i.e. external to the maintenance site 140, 140a-140d, e.g. cloud server-based remote monitoring unit, as illustrated in the example of FIG. 1. The remote monitoring unit 150 may be e.g. a cloud server, a service center, a maintenance center, or a data center. The mobile terminal device 110 and the remote monitoring unit 150 are communicatively coupled to each other. The communication between the mobile terminal device 110 and the remote monitoring unit 150 may be based on one or more known wireless communication technologies.

In response to the detecting of the at least one radio transmission from the at least one radio node 130 arranged to the maintenance site 140, 140a-140d for which the maintenance person 120 has the open maintenance order at the step 320, the mobile terminal device 110 may further generate an indication of the arrival to the maintenance site 140, 140a-140d for the maintenance person 120 via the mobile terminal device 110. In other words, the mobile terminal device 110 may be configured to generate the indication, e.g. a visual and/or audio indication, of the arrival of the maintenance person 120 to the maintenance site 140, 140a-140d. This enables providing a confirmation for the maintenance person 120 arriving at the correct maintenance site 140, 140a-140d to which the maintenance person 120 has the at least one open maintenance order. The indication may be generated via one or more input/output (I/O) devices of a user interface (UI) unit 540 of the mobile terminal device 110. The generation of the indication may be performed after the detection step 320 or after the step 330, i.e. the generation of the at least one first control signal to the remote monitoring unit 150.

In response to receiving the at least one first control signal from the mobile terminal device 110 the remote monitoring unit 150 may ignore, i.e. omit, subsequent fault codes from said maintenance site 140, 140a-140d. Alternatively or in addition, the at least one first control signal may further comprise an instruction for the remote monitoring unit 150 to ignore subsequent fault codes from said maintenance site 140, 140a-140d. The ignoring may comprise e.g. that maintenance orders are not generated by the remote monitoring unit 150 in response to receiving the subsequent fault codes from the maintenance site 140, 140a-140d. This enables that unnecessary, i.e. incorrect, fault codes caused by one or more maintenance related operations performed by the maintenance person 120 during a maintenance visit to the maintenance site 140, 140a-140d, do not lead to a generation of unnecessary, i.e. incorrect, maintenance orders by the remote monitoring unit 150. This, in turn, may increase accuracy of the generated maintenance orders and decrease unnecessary maintenance visits. Alternatively or in addition, the at least one first control signal may further comprise an instruction for the remote monitoring unit 150 to prevent closing of one or more open maintenance orders for said maintenance site 140, 140a-140d. The preventing may comprise for example that the open maintenance orders for said maintenance site 140, 140a-140d are not closed by the remote monitoring unit 150 in response to receiving one or more recovery indications from said maintenance site 140, 140a-140d. This enables that incorrect recovery indications caused by one or more maintenance related operations performed by the maintenance person 120 during a maintenance visit to the maintenance site 140, 140a-140d, do not lead to incorrect closing of the one or more open maintenance orders for said maintenance site 140, 140a-140d by the remote monitoring unit 150.

FIG. 4 illustrates schematically an example embodiment of the method according to the invention. At a step 410 the mobile terminal device 110 may continue the scanning of the radio transmissions within the radio range of the mobile terminal device 110 after generating the at least first control signal to the remote monitoring unit 150 at the step 330.

At a step 420, the mobile terminal device 110 may detect ending of the radio transmissions from the at least one radio node 130 arranged to the maintenance site 140, 140a-140d for which the maintenance person 120 had the at least one open maintenance order on arrival of the maintenance person 120. In other words, the mobile terminal device 110 may detect that the at least one radio transmission from the at least one radio node 130 arranged to the maintenance site 140, 140a-140d for which the maintenance person 120 had the at least one open maintenance order on arrival of the maintenance person 120 is not detected amongst the scanned radio transmissions anymore. The mobile terminal device 110 may close the at least one maintenance order after a completion of the one or more maintenance operations at the maintenance site 140, 140a-140d in response to receiving user input by the maintenance person 120. Thus, the at least one maintenance order may not necessary be open any more after the completion of the one or more maintenance operations at the maintenance site 140, 140a-140d. The mobile terminal device 110 may further generate a closing indication to the remote monitoring unit 150 to indicate the closing of the at least one maintenance order.

At a step 430, in response to the detecting ending of the radio transmissions from the at least one radio node arranged to the maintenance site 140, 140a-140d for which the maintenance person 120 had the at least one open maintenance order on arrival of the maintenance person 120 the mobile terminal device 110 may generate at least one second control signal to the remote monitoring unit 150. The at least one second control signal may comprise information representing an exit of the maintenance person 120 from the maintenance site 140, 140a-140d. The mobile terminal device 110 may apply a delay before generating the at least one second control signal. If the radio transmissions from the at least one radio node arranged to the maintenance site 140, 140a-140d for which the maintenance person 120 had the at least one open maintenance order on arrival of the maintenance person 120 are not detected during the delay, the mobile terminal device 110 may generate the at least one second control signal to the remote monitoring unit 150 to inform that the maintenance person 120 has exited from the maintenance site 140, 140a-140d. On the other hand, if at least one radio transmission from the at least one radio node arranged to the maintenance site 140, 140a-140d for which the maintenance person 120 had the at least one open maintenance order on arrival of the maintenance person 120 is detected during the delay, the mobile terminal device 110 does not generate the at least one second control signal to the remote monitoring unit 150. This indicates that the maintenance person 120 has not actually exited from the maintenance site 140, 140a-140d. Instead for example a visibility, i.e. connection to or reception from, said the at least one radio node 130 may have been lost at least momentarily. By applying the delay, the mobile terminal device 110 may ensure, i.e. confirm, that the maintenance person 120 has actually exited from the maintenance site 140, 140a-140d.

The remote monitoring unit 150 may terminate the ignoring of the subsequent fault codes from said maintenance site 140, 140a-140d, in response to receiving the at least one second control signal from the mobile terminal device 110. Alternatively or in addition, the at least one second control signal may further comprise an instruction for the remote monitoring unit 150 to terminate the ignoring of the subsequent fault codes from said maintenance site 140, 140a-140d.

Figure 5:
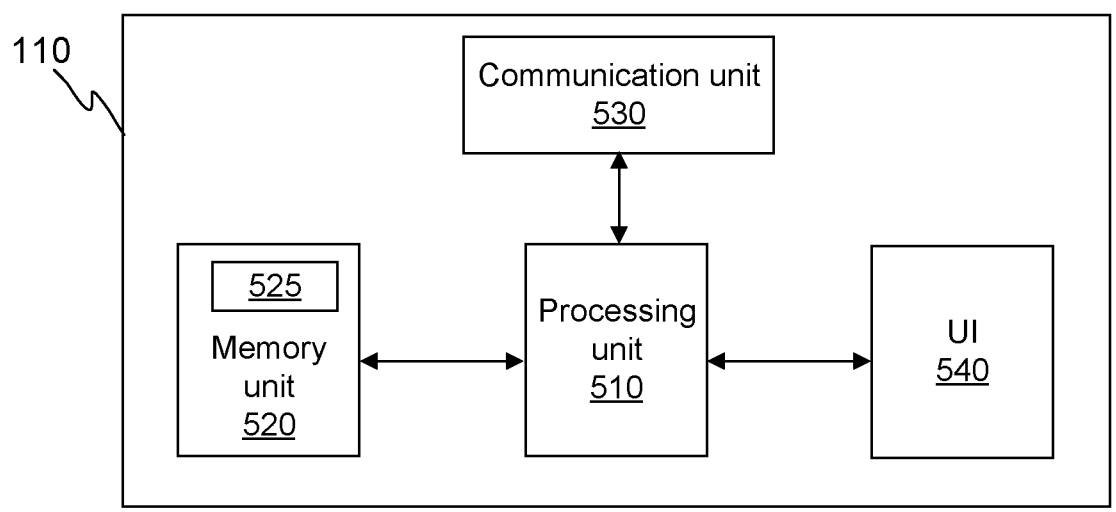
FIG. 5 illustrates schematically an example of components of a mobile terminal device according to the invention.

FIG. 5 schematically illustrates an example of components of the mobile terminal device 110 according to the invention. The mobile terminal device 110 may comprise a processing unit 510 comprising one or more processors, a memory unit 520 comprising one or more memories, a communication interface unit 530 comprising one or more communication devices, and possibly a user interface (UI) unit 540. The mentioned elements may be communicatively coupled to each other with e.g. an internal bus. The memory unit 520 may store and maintain portions of a computer program (code) 525 and any other data. The computer program 525 may comprise instructions which, when the computer program 525 is executed by the processing unit 510 of the mobile terminal device 110 may cause the processing unit 510, and thus the mobile terminal device 110 to carry out desired tasks, e.g. the operations of the mobile terminal device 110 and/or at least some of the method steps described above. The processing unit 510 may thus be arranged to access the memory unit 520 and retrieve and store any information therefrom and thereto. For sake of clarity, the processor herein refers to any unit suitable for processing information and control the operation of the mobile terminal device 110, among other tasks. The operations may also be implemented with a microcontroller solution with embedded software. Similarly, the memory unit 520 is not limited to a certain type of memory only, but any memory type suitable for storing the described pieces of information may be applied in the context of the present invention. The communication interface unit 530 provides an interface for communication with any external unit, e.g. the remote monitoring unit 150, the at least one node device 130, one or more radio devices, one or more databases, and/or any other external unit as described. The communication interface unit 530 may be based on one or more known wireless communication technologies in order to exchange pieces of information. The communication interface unit 530 may comprise one or more communication devices e.g. at least one radio transceiver, at least one antenna, etc. The user interface unit 540 may comprise one or more input/output (I/O) devices, such as buttons, keyboard, touch screen, microphone, loudspeaker, display and so on, for receiving user input and outputting information. The computer program 525 may be a computer program product that may be comprised in a tangible nonvolatile (non-transitory) computer-readable medium bearing the computer program code 525 embodied therein for use with a computer, i.e. the mobile terminal device 110.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for detecting an arrival of a maintenance person to a maintenance site, the method comprising:
scanning, by a mobile terminal carried by the maintenance person, radio transmissions from radio devices residing within a radio range of the mobile terminal device carried by the maintenance person,
detecting, by the mobile terminal, amongst the scanned radio transmissions at least one radio transmission from at least one radio node arranged at the maintenance site for which the maintenance person has at least one open maintenance order, and
transmitting, by the mobile terminal to a remote computer system, at least one first control signal comprising information representing the detection of the arrival of the maintenance person to the maintenance site
wherein said transmitting is performed in response to both the detecting of the at least one radio transmission and a determination by the mobile terminal that the maintenance person has the at least one open maintenance order at the maintenance site.

2. The method according to claim 1, wherein the detecting the at least one radio transmission from the at least one radio node arranged to the maintenance site comprises detecting at least one radio transmission comprising identifying information of the maintenance site for which the maintenance person has at least one open maintenance order.

3. The method according to claim 1 further comprising generating an indication of the arrival to the maintenance site via the mobile terminal device for the maintenance person.

4. A method for detecting an arrival of a maintenance person to a maintenance site, the method comprising:
scanning radio transmissions from radio devices residing within a radio range of a mobile terminal device carried by the maintenance person,
detecting amongst the scanned radio transmissions at least one radio transmission from at least one radio node arranged at the maintenance site for which the maintenance person has at least one open maintenance order, and
transmitting to a remote computer system at least one first control signal comprising information representing the detection of the arrival of the maintenance person to the maintenance site in response to the detecting of the at least one radio transmission, wherein the at least one first control signal further comprises an instruction to ignore subsequent fault codes from said maintenance site and/or to prevent closing of one or more open maintenance orders for said maintenance site.

5. The method according to claim 1, further comprising:
continuing the scanning of the radio transmissions within the radio range of the mobile terminal device carried by the maintenance person after generating the at least first control signal,
detecting ending of the radio transmissions from the at least one radio node arranged to the maintenance site for which the maintenance person had the at least one open maintenance order on arrival of the maintenance person, and
generating at least one second control signal comprising information representing an exit of the maintenance person from the maintenance site to the remote computer system.

6. The method according to claim 5, further comprising applying a delay before generating the at least one second control signal.

7. The method according to claim 5, wherein the at least one second control signal further comprises an instruction to terminate the ignoring of the subsequent fault codes from said maintenance site.

8. The method according to claim 1, wherein the radio transmissions from the at least one radio node are based on at least one short-range wireless radio technology.

9. The method according to claim 1, wherein the maintenance site is a people conveyor system or an automatic door system.

10. A detection system for detecting an arrival of a maintenance person to a maintenance site, the detection system comprises:
a mobile terminal device carried by the maintenance person,
at least one radio node arranged at the maintenance site, and
a remote computer system communicatively coupled to the mobile terminal device,
wherein the mobile terminal device is configured to:
scan radio transmissions from radio devices residing within a radio range of the mobile terminal device,
detect amongst the scanned radio transmissions at least one radio transmission from the at least one radio node arranged to the maintenance site for which the maintenance person has at least one open maintenance order, and
transmit to the remote computer system at least one first control signal comprising information representing the detection of the arrival of the maintenance person to the maintenance site,
wherein said mobile terminal device performs said transmitting in response to both the detecting of the at least one radio transmission and a determination by the mobile terminal device that the maintenance person has at least one open maintenance order at the maintenance site.

11. The detection system according to claim 10, wherein the detection of the at least one radio transmission from the at least one radio node arranged to the maintenance site comprises that the mobile terminal device is configured to detect at least one radio transmission comprising identifying information of the maintenance site for which the maintenance person has at least one open maintenance order.

12. The detection system according to claim 10, wherein the mobile terminal device further configured to generate an indication of the arrival to the maintenance site for the maintenance person.

13. The detection system according to claim 10, wherein the at least one first control signal further comprises an instruction to ignore subsequent fault codes from said maintenance site and/or to prevent closing of one or more open maintenance orders for said maintenance site.

14. The detection system according to claim 10, wherein the mobile terminal device is further configured to:
continue the scanning of the radio transmissions within the radio range of the mobile terminal device after generating the at least first control signal,
detect ending of the radio transmissions from the at least one radio node arranged to the maintenance site for which the maintenance person had the at least one open maintenance order on arrival of the maintenance person, and generate at least one second control signal comprising information representing an exit of the maintenance person from the maintenance site to the remote computer system.

15. The detection system according to claim 14, wherein the mobile terminal device is further configured to apply a delay before generating the at least one second control signal.

16. The detection system according to claim 14, wherein the at least one second control signal further comprises an instruction to terminate the ignoring of the subsequent fault codes from said maintenance site.

17. The detection system according to claim 10, wherein the radio transmissions from the at least one radio node are based on at least one short-range wireless radio technology.

18. The detection system according to claim 10, wherein the maintenance site (is a people conveyor system or an automatic door system.

19. A mobile terminal device for detecting an arrival of a maintenance person to a maintenance site, the mobile terminal device configured to be carried by the maintenance person, the mobile terminal device comprising:
   a processor, and
   a memory comprising a computer program code, wherein the memory and the computer program code are configured to, with the processor, cause the mobile terminal device at least to:
      scan radio transmissions from radio devices residing within a radio range of the mobile terminal device,
      detect amongst the scanned radio transmissions at least one radio transmission from the at least one radio node arranged at the maintenance site for which the maintenance person has at least one open maintenance order, and
      transmit to a remote computer system at least one first control signal comprising information representing the detection of the arrival of the maintenance person to the maintenance site in response to the detecting of the at least one radio transmission,
   wherein said transmitting is performed in response to both the detecting of the at least one radio transmission and a determination by the mobile terminal that the maintenance person has the at least one open maintenance order at the maintenance site.

20. A non-transitory computer readable medium storing a computer program comprising instructions which, when the program is executed by a mobile terminal device according to claim 19, cause the mobile terminal device to carry out a method comprising:
   scanning radio transmissions from radio devices residing within a radio range of a mobile terminal device carried by the maintenance person,
   detecting amongst the scanned radio transmissions at least one radio transmission from at least one radio node arranged to the maintenance site for which the maintenance person has at least one open maintenance order, and
   transmitting to a remote computer system at least one first control signal comprising information representing the detection of the arrival of the maintenance person to the maintenance site in response to the detecting of the at least one radio transmission,
   wherein said transmitting is performed in response to both the detecting of the at least one radio transmission and a determination by the mobile terminal that the maintenance person has the at least one open maintenance order at the maintenance site.

* * * * *